(12) United States Patent
Murakami

(10) Patent No.: US 12,467,945 B2
(45) Date of Patent: Nov. 11, 2025

(54) TEST BOARD AND METHOD FOR TESTING SEMICONDUCTOR DEVICE

(71) Applicant: KIOXIA CORPORATION, Tokyo (JP)

(72) Inventor: Hideaki Murakami, Saitama Saitama (JP)

(73) Assignee: Kioxia Corporation, Tokyo (JP)

( * ) Notice: Subject to any disclaimer, the term of this patent is extended or adjusted under 35 U.S.C. 154(b) by 258 days.

(21) Appl. No.: 17/898,998

(22) Filed: Aug. 30, 2022

(65) Prior Publication Data

US 2023/0273239 A1    Aug. 31, 2023

(30) Foreign Application Priority Data

Feb. 25, 2022    (JP) .................................. 2022-028395

(51) Int. Cl.
  *G01R 1/04*    (2006.01)
  *G01R 31/28*   (2006.01)

(52) U.S. Cl.
  CPC ......... *G01R 1/0466* (2013.01); *G01R 1/0483* (2013.01); *G01R 31/2879* (2013.01)

(58) Field of Classification Search
  CPC . G01R 1/0466; G01R 1/0483; G01R 31/2879
  See application file for complete search history.

(56) References Cited

U.S. PATENT DOCUMENTS

| | | | | |
|---|---|---|---|---|
| 4,090,667 A | * | 5/1978 | Crimmins | H01R 29/00 439/189 |
| 5,014,002 A | * | 5/1991 | Wiscombe | G01R 1/02 324/537 |
| 5,412,593 A | * | 5/1995 | Magel | G11C 17/16 365/96 |
| 6,051,968 A | * | 4/2000 | Shim | G01R 31/31905 324/756.07 |
| 11,152,077 B2 | | 10/2021 | Hamor et al. | |
| 2008/0043929 A1 | | 2/2008 | McEvers | |

(Continued)

FOREIGN PATENT DOCUMENTS

| | | | | |
|---|---|---|---|---|
| JP | 09178804 A | * | 7/1997 | ......... G01R 31/2849 |
| JP | 09229995 A | * | 9/1997 | |

OTHER PUBLICATIONS

Translation of JP-09229995-A (Year: 1997).*
Translation of JP-09178804-A (Year: 1997).*

*Primary Examiner* — Paresh Patel
(74) *Attorney, Agent, or Firm* — Kim & Stewart LLP

(57) ABSTRACT

A test board includes a substrate, a socket mounted on the substrate and including a first connector pin to be connected to a first terminal of a semiconductor device when the semiconductor device is mounted in the socket, a plurality of external terminals through which a voltage or a signal is supplied to the first connector, first and second current paths that can be electrically connected between the first connector pin and one of the plurality of external terminals, and a connection mechanism. The first current path includes a first circuit element. The second current path includes no circuit element or a second circuit element that is different from the first circuit element. The connection mechanism is capable of electrically connecting the first connector pin to one of the plurality of external terminals via one of the first current path and the second current path.

8 Claims, 17 Drawing Sheets

(56) References Cited

U.S. PATENT DOCUMENTS

| | | | |
|---|---|---|---|
| 2009/0108851 A1* | 4/2009 | Chen | G01R 31/2808 |
| | | | 324/555 |
| 2009/0308233 A1* | 12/2009 | Jacob | G10H 3/186 |
| | | | 84/726 |
| 2013/0293257 A1* | 11/2013 | Liu | G01R 31/40 |
| | | | 324/764.01 |
| 2017/0046983 A1* | 2/2017 | Neal | G09B 23/183 |
| 2019/0120874 A1 | 4/2019 | Anderson et al. | |
| 2021/0373070 A1* | 12/2021 | Shin | G01R 31/2817 |

* cited by examiner

US 12,467,945 B2

TEST BOARD AND METHOD FOR TESTING SEMICONDUCTOR DEVICE

CROSS-REFERENCE TO RELATED APPLICATION

This application is based upon and claims the benefit of priority from Japanese Patent Application No. 2022-028395, filed Feb. 25, 2022, the entire contents of which are incorporated herein by reference.

FIELD

Embodiments described herein relate generally to a method for manufacturing a test board and a semiconductor device.

BACKGROUND

An embedded Multimedia Card (eMMC), a Universal Flash Storage (UFS), and the like are known as semiconductor devices. In the manufacturing process of these semiconductor devices, various tests are executed for the purpose of sorting out non-defective products and defective products.

During the test, one or a plurality of semiconductor devices are mounted on a test board, the test board is installed under certain conditions, for example, in environments of high temperature and/or high humidity, and the terminals of the semiconductor devices are supplied with a voltage, a signal, or the like.

Further, during the test, different circuit elements may be connected to the voltage supply terminal and the signal supply terminal of the semiconductor device, or a circuit element may be connected to only one terminal.

DETAILED DESCRIPTION

Figure 1:
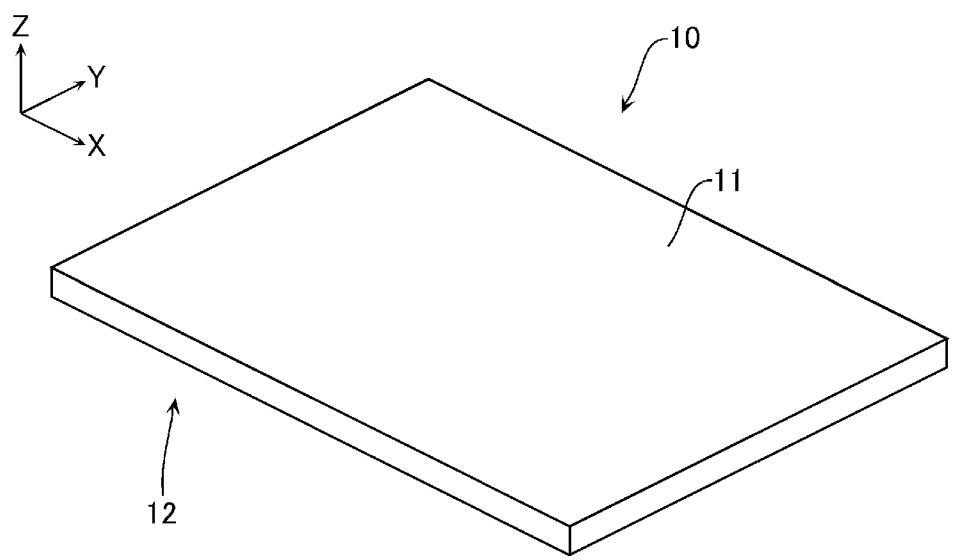
FIG. 1 is a schematic perspective view showing the configuration of a semiconductor device.

The terminal arrangement may be common between two types of semiconductor devices. For example, the terminal arrangement is common between the above-described eMMC and UFS. In such a case, it is desirable to use a common test board for testing both semiconductor devices.

In general, according to one embodiment, a test board includes a substrate, a socket mounted on the substrate and including a first connector pin to be connected to a first terminal of a semiconductor device when the semiconductor device is mounted on the socket, and a plurality of external terminals through which a voltage or a signal is supplied to the first connector pin. Further, the test board includes a first current path and a second current path that can be electrically connected between the first connector pin and one of the plurality of external terminals. The first current path includes a first circuit element. The second current path includes no circuit element or a second circuit element that is different from the first circuit element. Further, this test board has a first connection mechanism capable of electrically connecting the first connector pin to one of the plurality of external terminals via one of the first current path and the second current path.

Such a test board can be commonly used for testing two types of semiconductor devices. For example, when testing one semiconductor device, it is possible to connect the first terminal of the semiconductor device to an external terminal via a first circuit element such as a resistor. Further, when testing another semiconductor device, it is possible to connect the first terminal of the semiconductor device to an external terminal without going through the first circuit element such as a resistor or via another circuit element such as a capacitor.

However, even when the terminal arrangement is common between two types of semiconductor devices, the functions assigned to the terminals may differ. For example, in one semiconductor device, the terminal provided at a certain position may be used for supplying a voltage, but in the other semiconductor device, the terminal provided at this position may be used for supplying a signal.

In such a case, which terminal a circuit element is to be connected is different or which circuit element to be connected to which terminal is different, so that it may be difficult to use a common test board. For example, a circuit element may not be connected to a terminal when inputting a power supply voltage of a semiconductor device, and a resistance element connected to a terminal may be desired when inputting a data signal. Further, a capacitor connected to the other terminals may be desired. In the following description, a resistor, a capacitor, an inductor, a light emitting diode or other diodes, and circuit elements other than these may be simply referred to as a "circuit element". Further, when referring to two types of different circuit elements such as a resistor and a capacitor, one of them may be referred to as a "first circuit element" and the other may be referred to as a "second circuit element" or the like.

Semiconductor Device 10

Figure 2:
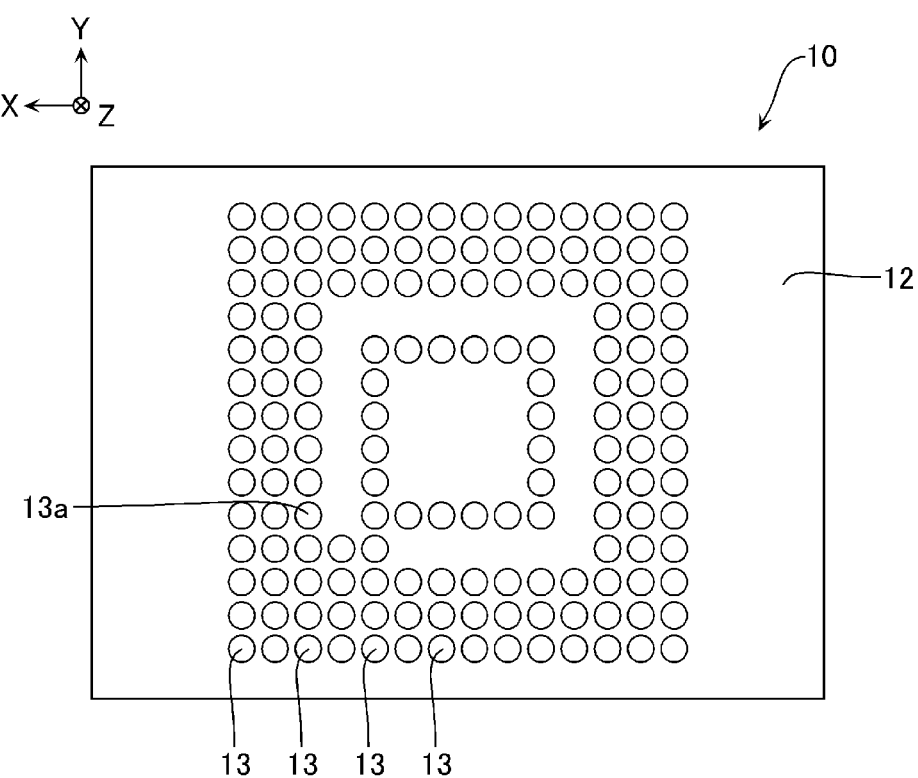
FIG. 2 is a schematic bottom view showing the back surface of the semiconductor device.

Next, a semiconductor device 10 to be subjected to various tests will be described. FIG. 1 is a schematic perspective view showing the configuration of the semiconductor device 10. FIG. 2 is a schematic bottom view showing a back surface 12 of the semiconductor device 10.

The semiconductor device 10 may be, for example, the eMMC or the UFS. Although an eMMC or a UFS is shown in FIGS. 1 and 2, the "semiconductor device" as used herein is not limited to the eMMC and the UFS.

FIG. 1 illustrates a surface 11 of the semiconductor device 10. FIG. 2 illustrates a back surface 12 of the semiconductor device 10. A plurality of terminals 13 are provided on the back surface 12 of the semiconductor device 10. A part of these plurality of terminals 13 functions as a voltage supply terminal that supplies power supply voltages $V_{CC}$ and $V_{CCQ}$ to the circuit in the semiconductor device 10. Further, a part of these plurality of terminals 13 functions as a voltage supply terminal that supplies a ground voltage $V_{SS}$ to the circuit in the semiconductor device 10. Further, a part of these plurality of terminals 13 functions as a signal supply terminal that supplies data signals DQ0 to DQ7 to the circuit in the semiconductor device 10. Further, a part of these plurality of terminals 13 functions as a signal supply terminal that supplies a control signal to the circuit in the semiconductor device 10. Further, no function is assigned to a part of these plurality of terminals 13.

As described above, the arrangement of the terminals 13 is common between an eMMC and a UFS. For example, regardless of whether the semiconductor device 10 is an eMMC or a UFS, the terminals 13 are arranged substantially in a matrix in the X direction and the Y direction as shown in FIG. 2. In the example of FIG. 2, 154 terminals 13 are provided on the back surface 12 of the semiconductor device 10.

However, the function assigned to each terminal 13 differs depending on whether the semiconductor device 10 is an eMMC or a UFS. For example, when the semiconductor device 10 is an eMMC, a terminal 13a shown in FIG. 2 functions as a signal supply terminal. On the other hand, when the semiconductor device 10 is a UFS, the terminal 13a shown in FIG. 2 functions as a voltage supply terminal.

Test Board

Next, a test board according to each embodiment will be described in detail with reference to the drawings. The following embodiments are only examples, and are not intended to limit the present disclosure. Further, the following drawings are schematic, and some configurations and the like may be omitted for convenience of explanation. Further, the same reference numerals may be given to parts common to the plurality of embodiments, and the description thereof may be omitted.

First Embodiment

As described above, when the types of the semiconductor devices 10 are different, the functions assigned to the terminals 13 (FIG. 2) of the semiconductor devices 10 may be different. Therefore, for example, which voltage to be supplied to which terminal 13 (FIG. 2) varies depending on whether the test is executed for the eMMC or the test is executed for the UFS. Further, which terminal 13 (FIG. 2) a circuit element such as a resistance element R is to be connected is different.

Therefore, a test board 100 according to the first embodiment is configured such that which voltage is to be supplied to which terminal 13 (FIG. 2) can be adjusted. Further, it is possible to adjust which terminal 13 (FIG. 2) the circuit element is to be connected to. This point will be described below.

Figure 3:
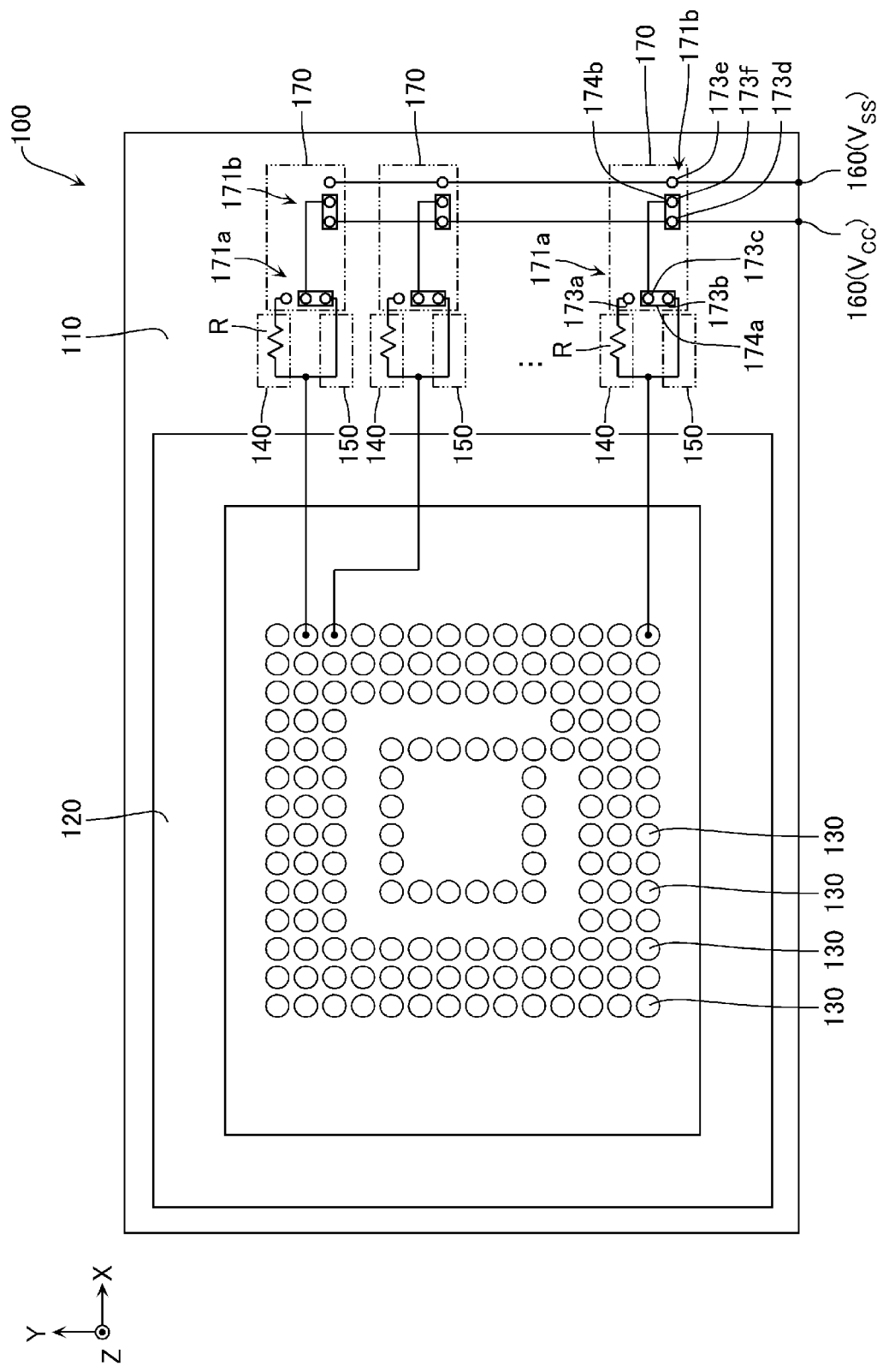
FIG. 3 is a schematic plan view showing the configuration of a test board according to a first embodiment.
Figure 4:
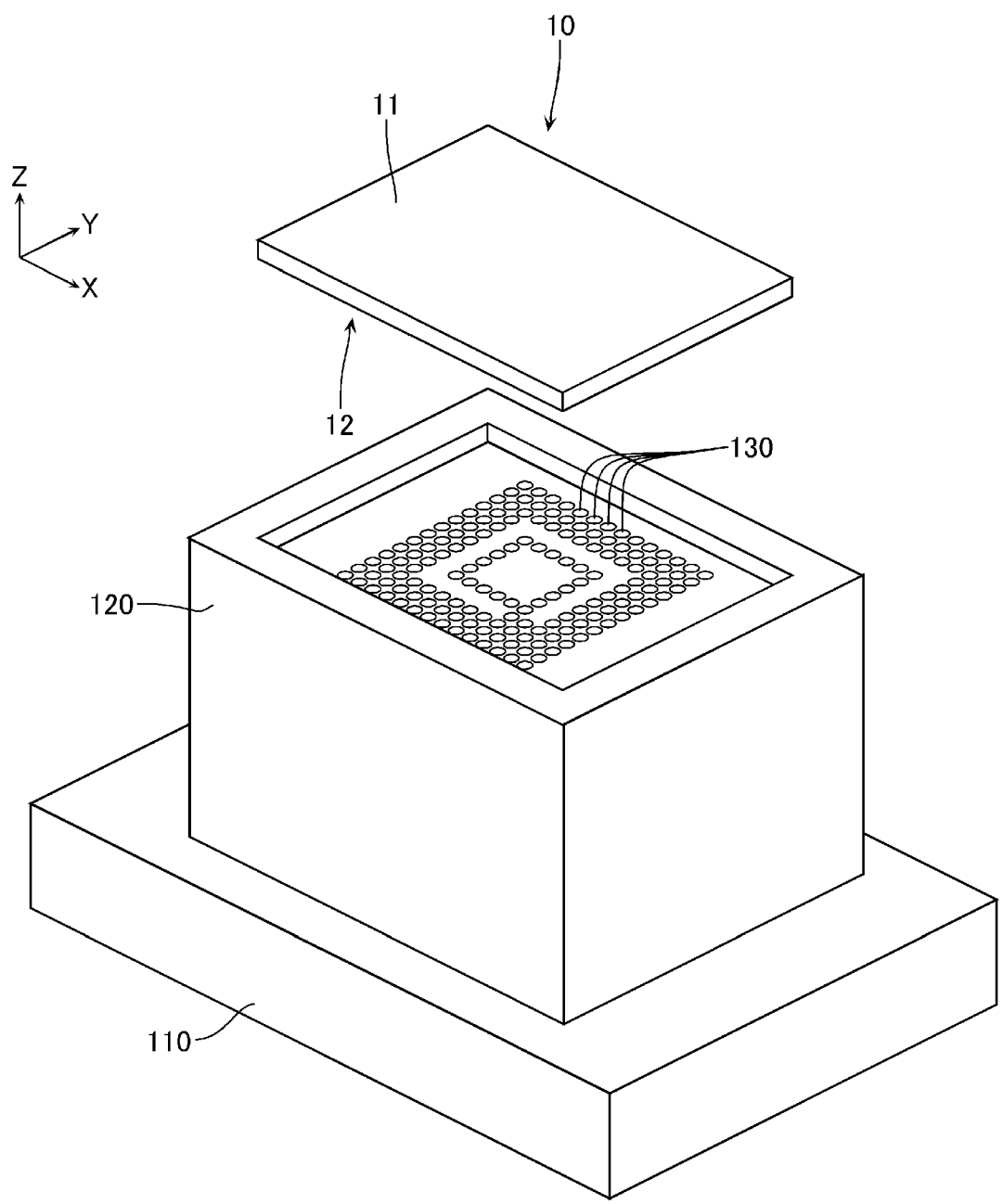
FIG. 4 is a schematic perspective view showing the configuration of a socket.
Figure 5:
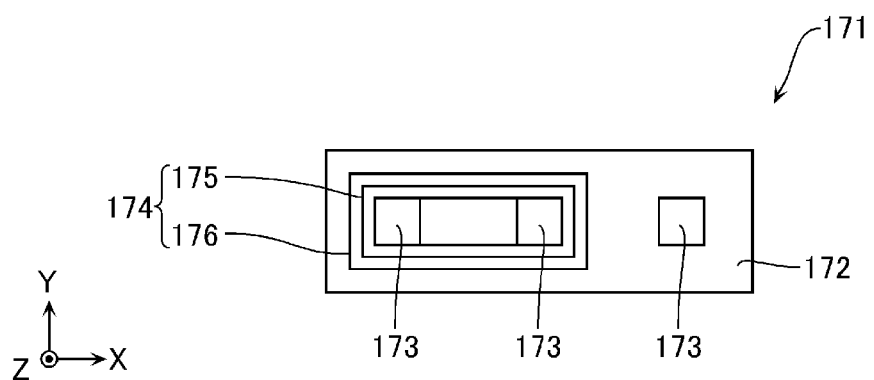
FIG. 5 is a schematic plan view showing the configuration of a jumper switch.
Figure 6:
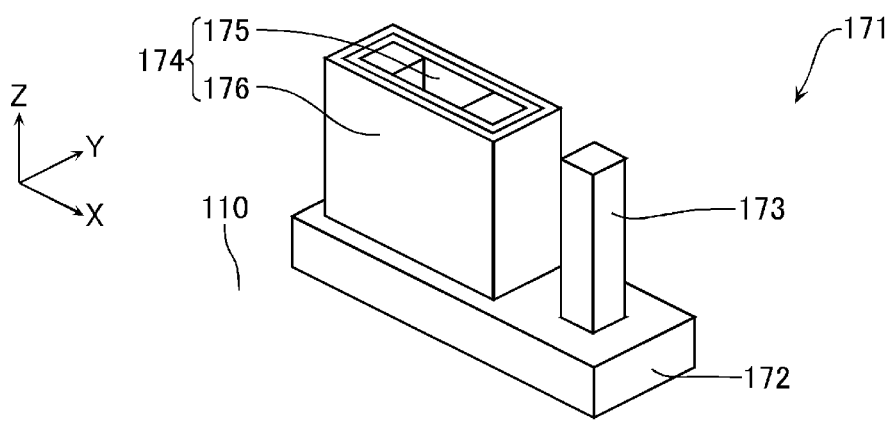
FIG. 6 is a schematic perspective view showing the configuration of the jumper switch.
Figure 7:
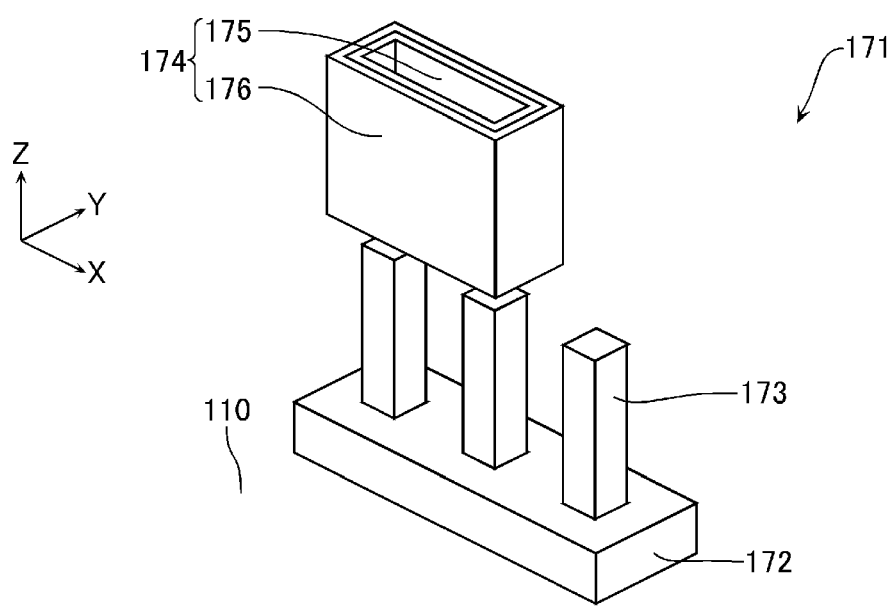
FIG. 7 is a schematic perspective view showing the configuration of the jumper switch.

FIG. 3 is a schematic plan view showing the configuration of the test board 100 according to the first embodiment. FIG. 4 is a schematic perspective view showing the configuration of a socket 120 mounted on the test board 100. FIG. 5 is a schematic plan view showing the configuration of a jumper switch 171 mounted on the test board 100. FIGS. 6 and 7 are schematic perspective views showing the configuration of the jumper switch 171 mounted on the test board 100.

As shown in FIG. 3, the test board 100 includes a substrate 110, the socket 120 mounted on the substrate 110, a plurality of connector pins 130 provided in the socket 120, and two external terminals 160 capable of supplying the power supply voltage $V_{CC}$ or the ground voltage $V_{SS}$ to the plurality of connector pins 130.

The substrate 110 may be, for example, a printed wiring circuit or the like.

The socket 120 is configured such that the semiconductor device 10 as described with reference to FIGS. 1 and 2 can be mounted. When using the test board 100, for example, as shown in FIG. 4, the semiconductor device 10 is mounted on the socket 120 such that the back surface 12 of the semiconductor device 10 is on the socket 120 side.

The connector pins 130 (FIG. 3) are electrically connected to a plurality of wirings provided on the substrate 110, respectively. As shown in FIGS. 2 and 3, the connector pin 130 is provided in the socket 120 in a pattern corresponding to the plurality of terminals 13 provided on the back surface 12 of the semiconductor device 10. Therefore, for example, when the semiconductor device 10 is mounted in the socket 120 as shown in FIG. 4, the plurality of terminals 13 provided on the back surface 12 of the semiconductor device 10 come into contact with the plurality of connector pins 130 provided in the socket 120, respectively.

Each of the external terminals 160 (FIG. 3) is configured to be electrically connectable to the connector pin 130 via wiring or the like provided on the substrate 110. In the described example, the external terminal 160 to which the power supply voltage $V_{CC}$ is supplied is shown as the external terminal 160 ($V_{CC}$). Further, the external terminal 160 to which the ground voltage $V_{SS}$ is supplied is shown as the external terminal 160 ($V_{SS}$).

Further, as shown in FIG. 3, the test board 100 includes a plurality of current paths 140 and 150 as current paths that can be electrically connected between the plurality of connector pins 130 and the external terminal 160. The plurality of (for example, 154) current paths 140 and 150 are provided corresponding to the plurality of (for example, 154) connector pins 130, respectively. The current path 140 includes a resistance element R as a circuit element. The current path 150 does not include circuit elements.

Further, as shown in FIG. 3, the test board 100 includes a plurality of connection mechanisms 170 provided corresponding to the plurality of connector pins 130. The connection mechanism 170 can electrically connect the connector pin 130 to the external terminal 160 ($V_{CC}$), or electrically connect to the external terminal 160 ($V_{SS}$). Further, the connection mechanism 170 can connect the connector pin 130 to the external terminal 160 via the current path 140, or can connect the connector pin 130 to the external terminal 160 via the current path 150.

Each of the connection mechanisms 170 according to the first embodiment includes two jumper switches 171. As shown in FIGS. 5 and 6, for example, the jumper switch 171 includes a jumper post 172 provided on the substrate 110, three jumper pins 173 provided on the jumper post 172, and a jumper plug 174 that can come into contact with the outer peripheral surfaces of two jumper pins 173. In the described example, the jumper post 172 has the X direction as the longitudinal direction. Further, the three jumper pins 173 are arranged in the X direction and each extends in the Z direction. The jumper plug 174 includes a metal plate 175 and a cover 176 such as a resin that covers the outer peripheral surface of the metal plate 175. The metal plate 175 has a square cylinder shape and is able to surround two jumper pins 173 adjacent to each other in the X direction and not to surround the remaining one jumper pin 173. The inner peripheral surface of the metal plate 175 includes a part that comes into contact with the outer peripheral surface of one of the two jumper pins 173 adjacent to each other in the X direction. Further, the inner peripheral surface of the metal plate 175 includes a part that comes into contact with the outer peripheral surface of the other of the two jumper pins 173 adjacent to each other in the X direction. For example, as shown in FIG. 6, it is possible to attach the jumper plug 174 to the two jumper pins 173. Further, as shown in FIG. 7, it is also possible to pull out the jumper plug 174 from the jumper pin 173.

The configurations shown in FIGS. 5 to 7 may be changed by exchanging the X direction and the Y direction.

FIG. 3 illustrates two jumper switches 171a and 171b in the connection mechanism 170.

The jumper switch 171a includes jumper pins 173a, 173b, and 173c and a jumper plug 174a. The jumper pin 173a is electrically connected to the connector pin 130, via the current path 140 including the resistance element R. The jumper pin 173b is electrically connected to the connector pin 130, via the current path 150 that does not include a circuit element. The jumper pin 173c is provided corresponding to the jumper pins 173a and 173b, and is disposed between the jumper pins 173a and 173b (see FIG. 5). The jumper plug 174a can electrically connect one of the jumper pins 173a and 173b to the jumper pin 173c.

The jumper switch 171b includes jumper pins 173d, 173e, and 173f and a jumper plug 174b. The jumper pin 173d is electrically connected to the external terminal 160 ($V_{CC}$). The jumper pin 173e is electrically connected to the external terminal 160 ($V_{SS}$). The jumper pin 173f is provided corresponding to the jumper pins 173d and 173e, and is disposed between the jumper pins 173d and 173e (see FIG. 5). The jumper pin 173f is electrically connected to the jumper pin 173c. The jumper plug 174b can electrically connect one of the jumper pins 173d and 173e to the jumper pin 173f.

Test Method

As described above, the semiconductor device 10 is subjected to various tests. In the following example, high accelerated temperature and humidity stress test (HAST) will be described. However, the "test" as used herein is not limited to HAST.

Figure 8:
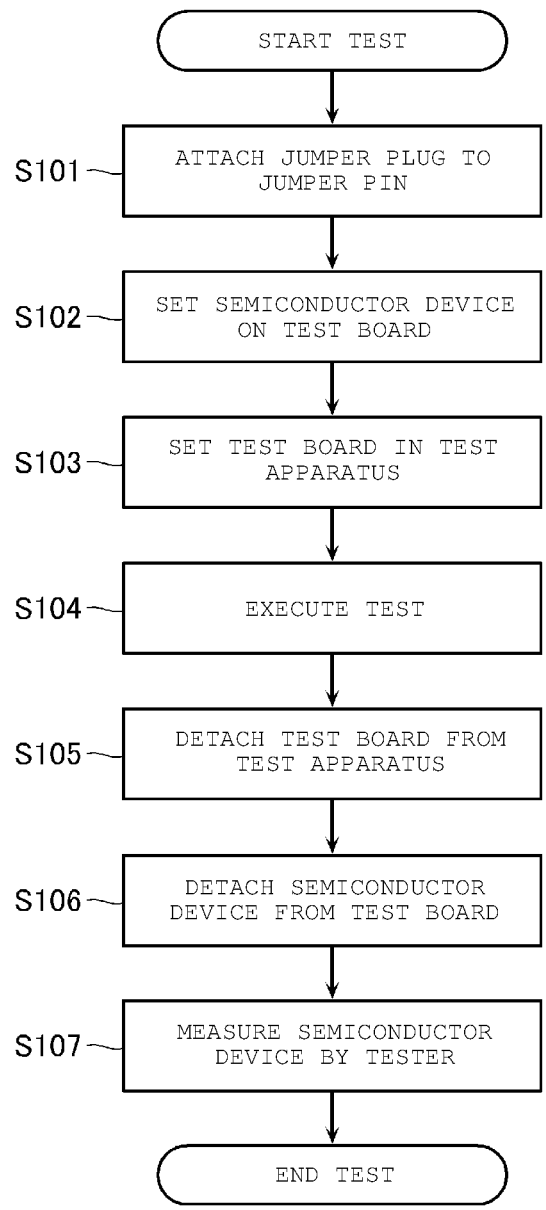
FIG. 8 is a flowchart illustrating a test method using the test board.

FIG. 8 is a schematic flowchart illustrating a test method using the test board 100.

In this test method, for example, the jumper plug 174 is attached to the jumper pin 173, according to the type of the semiconductor device 10 and the type of the test (step S101). In the example of HAST, for example, the terminal 13 for supplying the power supply voltage $V_{CC}$ is electrically connected to the external terminal 160 ($V_{CC}$) without going through the resistance element R (via the current path 150). Further, for example, the terminal 13 for supplying the ground voltage $V_{SS}$ is electrically connected to the external terminal 160 ($V_{SS}$) without going through the resistance element R (via the current path 150). Further, for example, the terminal 13 for supplying the data signals DQ0, DQ2, DQ4, and DQ6 is electrically connected to the external terminal 160 ($V_{CC}$) via the resistance element R (via the current path 140). Further, for example, the terminal 13 for supplying the data signals DQ1, DQ3, DQ5, DQ7 is electrically connected to the external terminal 160 ($V_{SS}$) via the resistance element R (via the current path 140). Further, for example, the terminal 13 to which the function is not assigned is not connected to the external terminal 160. In the connection mechanism 170 corresponding to such a terminal 13, the jumper plug 174 may be detached.

Next, as described with reference to FIG. 4, the semiconductor device 10 is set on the test board 100 (step S102). Next, for example, the test board 100 is set in a test apparatus (step S103). Next, for example, a test is executed (step S104). In the example of HAST, the semiconductor device 10 is placed in a high temperature and high humidity environment, and in this state, a fixed voltage is supplied to each terminal 13 (FIG. 2) for a predetermined time. Next, for example, the test board 100 is detached from the test apparatus (step S105). Next, for example, the semiconductor device 10 is detached from the test board 100 (step S106). Next, the semiconductor device 10 is measured by a tester (step S107). For example, data is read or written from or to the semiconductor device 10 to check whether or not the semiconductor device 10 operates normally.

Second Embodiment

As described with reference to FIG. 3, in the test board 100 according to the first embodiment, one socket 120 is provided on the substrate 110. However, such a configuration is only an example. For example, it is possible to provide a plurality of sockets 120 on the substrate 110. The following is an example of such a structure.

Figure 9:
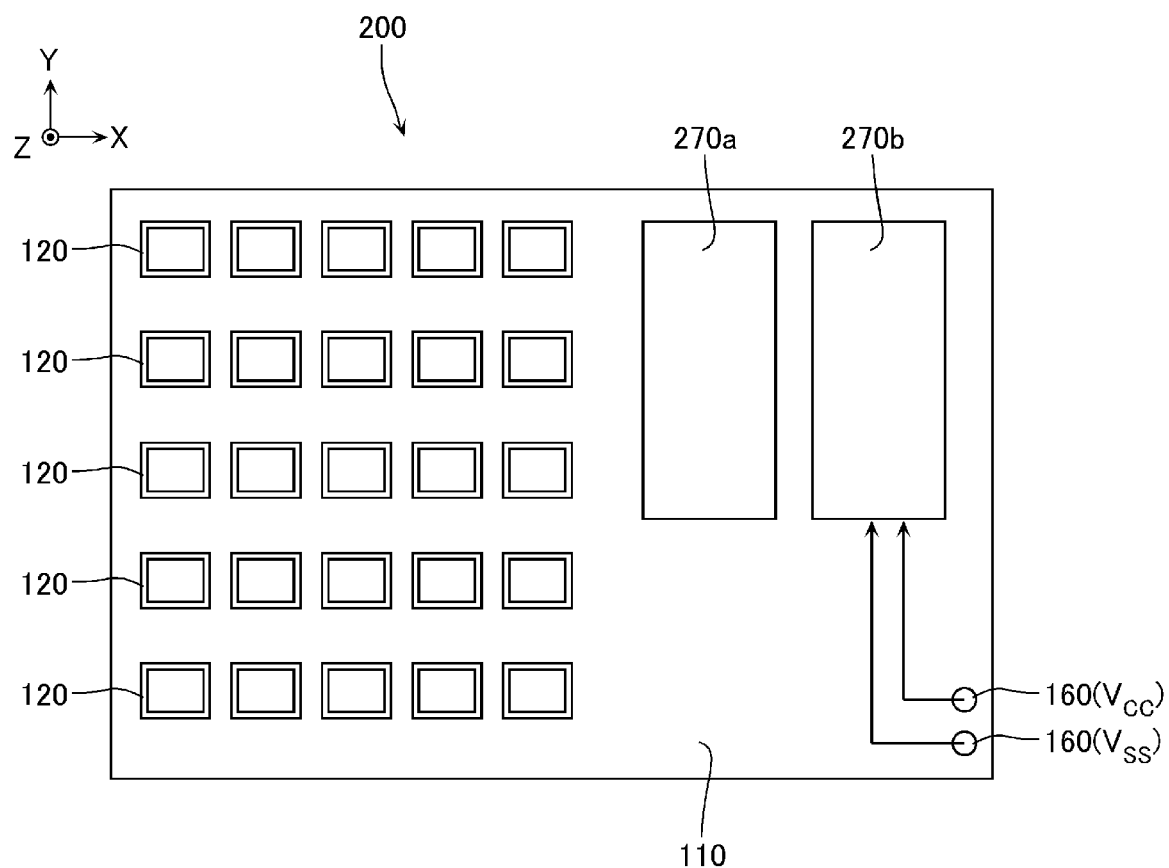
FIG. 9 is a schematic plan view showing the configuration of a test board according to a second embodiment.
Figure 10:
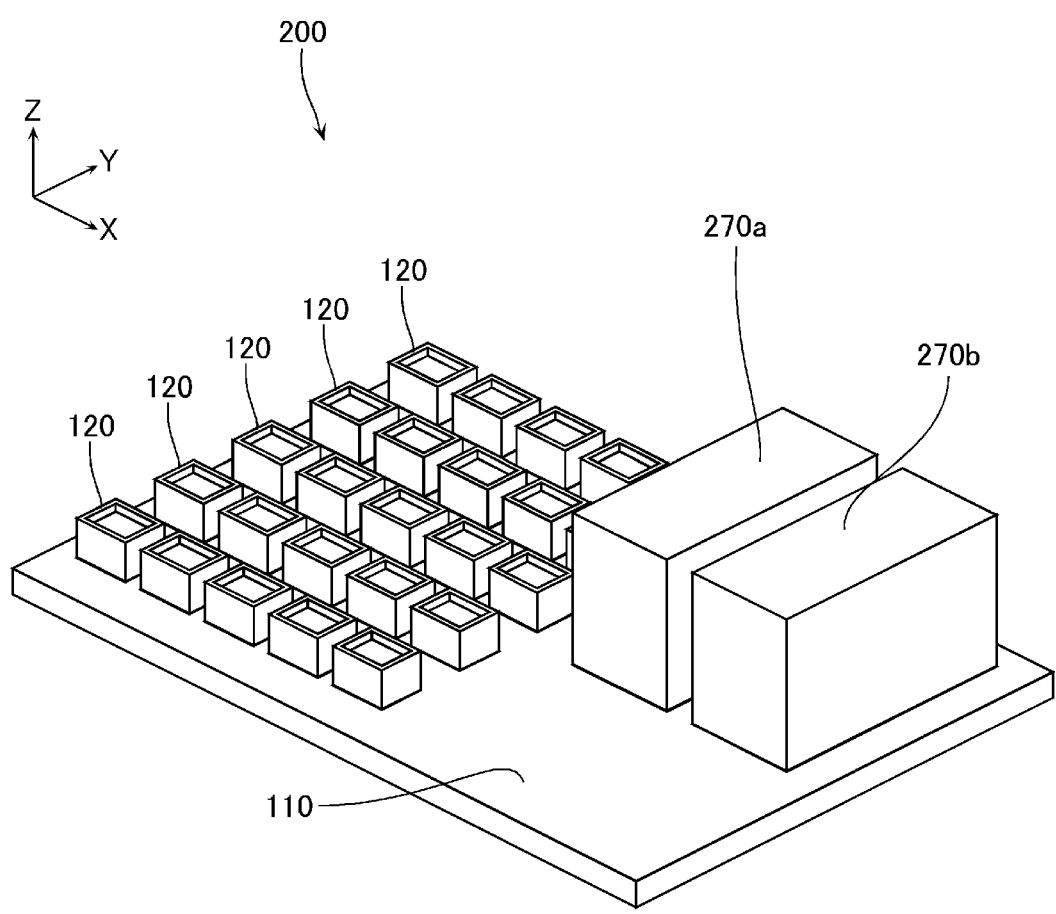
FIG. 10 is a schematic perspective view showing the configuration of the test board.
Figure 11:
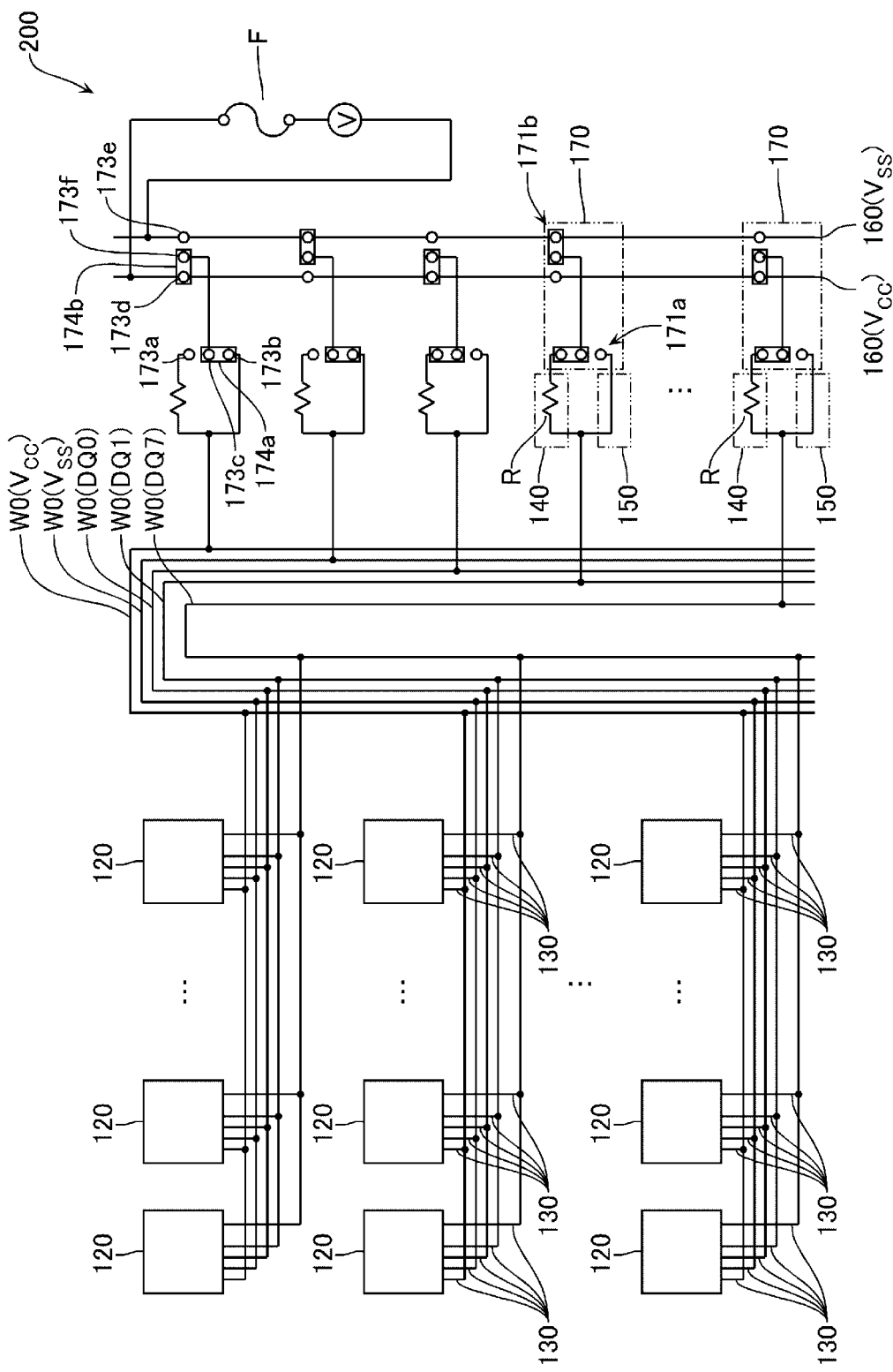
FIG. 11 is a schematic circuit diagram showing the configuration of the test board.

FIG. 9 is a schematic plan view showing the configuration of a test board 200 according to the second embodiment. FIG. 10 is a schematic perspective view showing the configuration of the test board 200. FIG. 11 is a schematic circuit diagram showing the configuration of the test board 200.

As shown in FIGS. 9 and 10, the test board 200 according to the second embodiment includes the substrate 110 and a plurality of sockets 120 mounted on the substrate 110. In the examples of FIGS. 9 and 10, a total of 25 sockets 120 are provided on the substrate 110, five sockets in the X direction and five sockets in the Y direction. Further, as described with reference to FIG. 3, the plurality of connector pins 130 are provided at positions corresponding to respective sockets 120. As shown in FIG. 11, these plurality of connector pins 130 are electrically and commonly connected between the plurality of sockets 120. For example, the test board 200 includes a plurality of (for example, 154) wirings W0 provided corresponding to a plurality of (154 in the example of FIG. 3) connector pins 130. In FIG. 11, the wiring W0 to which the power supply voltage $V_{CC}$ is supplied is shown as the wiring W0 ($V_{CC}$). Similarly, the wiring W0 to which the ground voltage $V_{SS}$ is supplied and the wiring W0 to which the data signals DQ0, DQ1, and DQ7 are supplied are shown as the wiring W0 ($V_{SS}$) f W0 (DQ0), W0 (DQ1), and W0 (DQ7), respectively. The plurality of wirings W0 are commonly connected to the plurality of connector pins 130 corresponding to the respective sockets 120, respectively. For example, the wiring W0 (DQ0) is connected to the connector pin 130 corresponding to the data signal DQ0 of each socket 120. That is, as shown in FIGS. 9 and 10, when a total of 25 sockets 120 are provided on the substrate 110, the wiring W0 (DQ0) is commonly connected to the 25 connector pins 130.

Further, FIGS. 9 and 10 illustrate jumper blocks 270a and 270b. The jumper block 270a includes a plurality of (for example, 154) jumper switches 171a described with reference to FIG. 3. The jumper block 270b includes a plurality of (for example, 154) jumper switches 171b described with reference to FIG. 3.

Further, in FIG. 11, a voltage source V and a fuse F connected in series between the external terminal 160 ($V_{CC}$) and the external terminal 160 ($V_{SS}$) are shown. In the shown example, the fuse F is provided in the current path between the voltage source V and the external terminal 160 ($V_{CC}$).

In the other configurations, the test board 200 according to the second embodiment is configured in the same manner as the test board 100 according to the first embodiment.

Third Embodiment

As shown in FIG. 11, in the test board 200 according to the second embodiment, as a current path that can be electrically connected between the wiring W0 and the external terminal 160, two current paths, that is, the current path 140 including the resistance element R and the current path 150 which does not include a circuit element are provided. However, such a configuration is only an example. For example, the number of current paths between the wiring W0 and the external terminal 160 may be three or more. Further, these plurality of current paths may or may not include circuit elements. Further, the circuit element to be provided in the plurality of current paths may be the resistance element R, a capacitor C, or another circuit element (for example, an inductor L, a light emitting diode LED or another diode D, or circuit elements other than these). The same applies below. The following is an example of such a structure.

Figure 12:
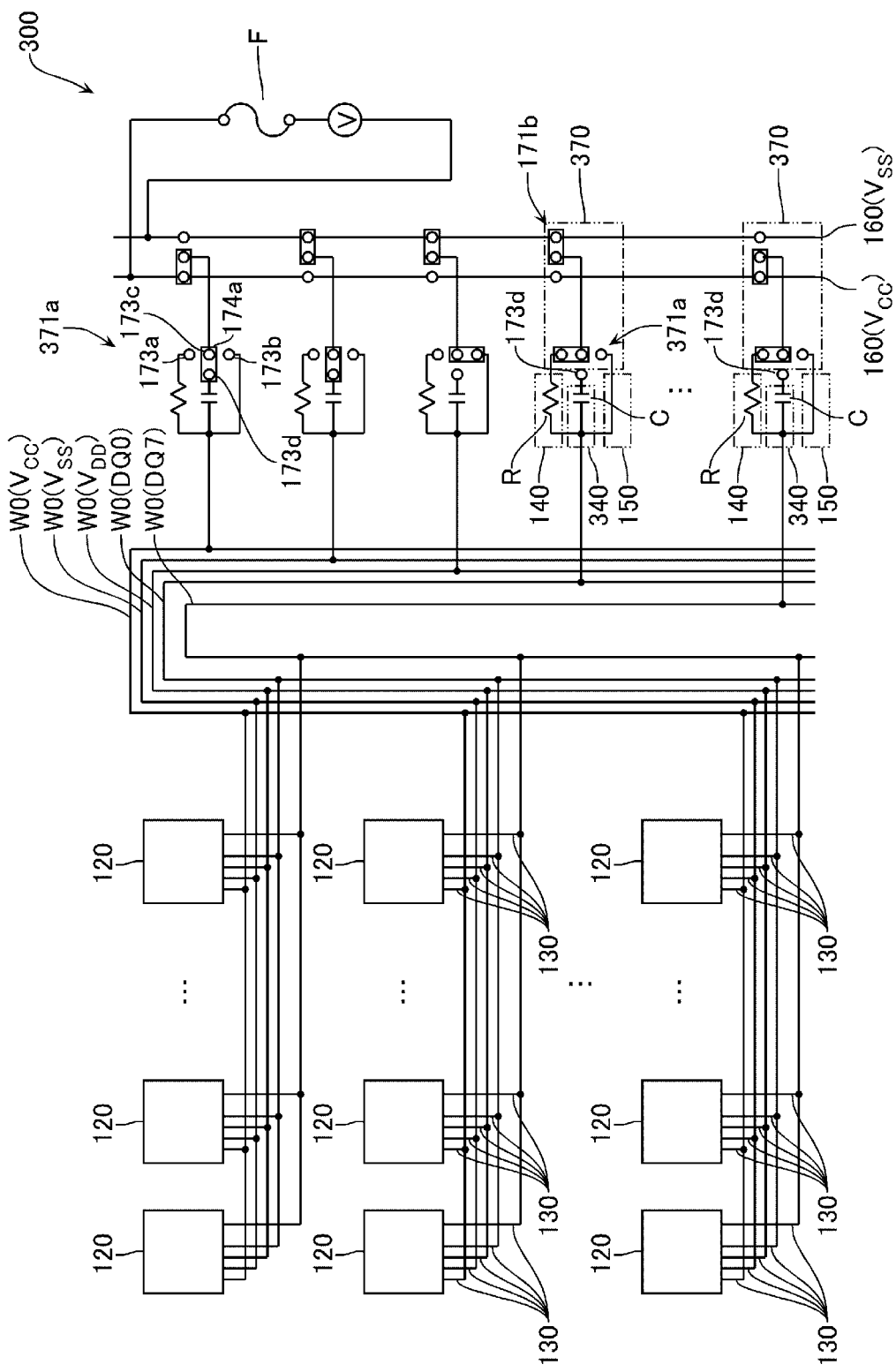
FIG. 12 is a schematic circuit diagram showing the configuration of a test board according to a third embodiment.

FIG. 12 is a schematic circuit diagram showing the configuration of a test board 300 according to the third embodiment. The test board 300 is basically configured in the same manner as the test board 200.

However, the test board 300 includes, in addition to the current paths 140 and 150, a plurality of current paths 340 electrically connected to the plurality of connector pins 130, respectively. The current path 340 includes the capacitor C as a circuit element.

Further, the test board 300 includes a connection mechanism 370 instead of the connection mechanism 170. The connection mechanism 370 is basically configured in the same manner as the connection mechanism 170. However, the connection mechanism 370 includes a jumper switch 371a instead of the jumper switch 171a. The jumper switch 371a is basically configured in the same manner as the jumper switch 171a. However, the jumper switch 371a includes a fourth jumper pin 173d in addition to the three jumper pins 173a, 173b, and 173c. The fourth jumper pin 173d is electrically connected to the connector pin 130 via the current path 340 including the capacitor C. The jumper plug 174a in the connection mechanism 370 can electrically connect one of the jumper pins 173a, 173b, and 173d to the jumper pin 173c.

The test board 300 according to the third embodiment includes the plurality of sockets 120 like the test board 200 according to the second embodiment. However, such a configuration is only an example. For example, the test board 300 according to the third embodiment may include only one socket 120 like the test board 100 according to the first embodiment.

Fourth Embodiment

As shown in FIG. 12, in the test board 300 according to the third embodiment, the current path 140 including the resistance element R, the current path 150 not including the circuit element, and the current path 340 including the capacitor C are connected in parallel between the wiring W0 and the external terminal 160. However, such a configuration is only an example. For example, a plurality of circuit elements may be connected in series between the wiring W0 and the external terminal 160. In such a case, the number of circuit elements connected in series between the wiring W0 and the external terminal 160 may be two or three or more. Further, the circuit elements connected in series may be the resistance element R, the capacitor C, or another circuit element. The following is an example of such a structure.

Figure 13:
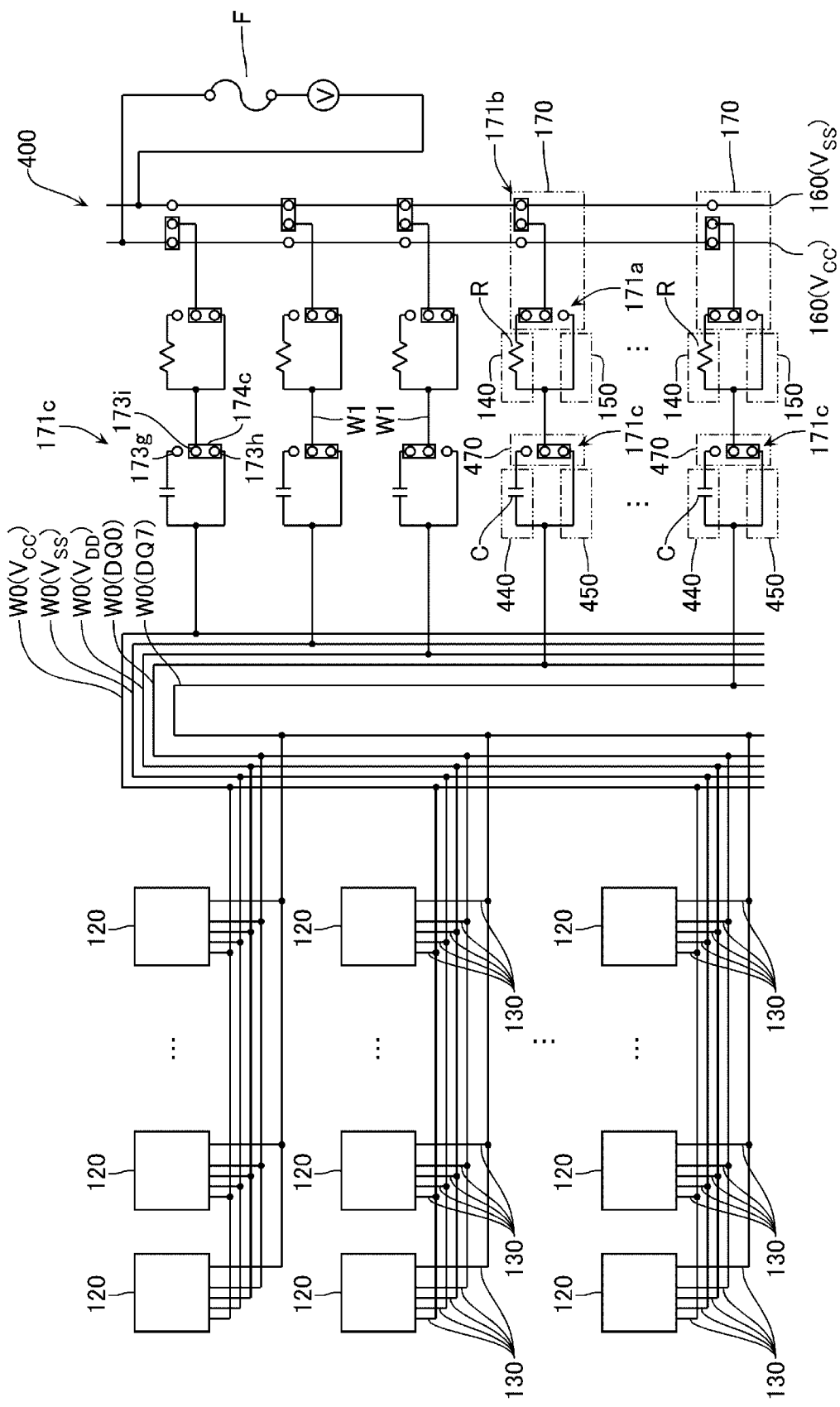
FIG. 13 is a schematic circuit diagram showing the configuration of a test board according to a fourth embodiment.

FIG. 13 is a schematic circuit diagram showing the configuration of a test board 400 according to the fourth embodiment. The test board 400 is basically configured in the same manner as the test board 200.

However, the test board 400 includes a wiring W1 provided in the current path between the wiring W0 and the external terminal 160. The wiring W1 is configured to be electrically connectable to the external terminal 160 via the current path 140 or 150.

Further, the test board 400 includes current paths 440 and 450 as current paths that can be electrically connected between the wiring W0 and the wiring W1. A plurality of (for example, 154) current paths 440 and 450 are provided corresponding to a plurality of (for example, 154) wirings W0, respectively. The current path 440 includes the capacitor C as a circuit element. The current path 450 does not include circuit elements.

Further, the test board 400 includes a plurality of connection mechanisms 470 provided corresponding to the plurality of connector pins 130. The connection mechanism 470 can electrically connect the connector pin 130 to the wiring W1 via the current path 440, or can electrically connect to the wiring W1 via the current path 450.

Each connection mechanism 470 includes one jumper switch 171c.

The jumper switch 171c includes jumper pins 173g, 173h, and 173i and a jumper plug 174c. The jumper pin 173g is electrically connected to the connector pin 130 via the current path 440 including the capacitor C. The jumper pin 173h is electrically connected to the connector pin 130 via the current path 450 that does not include a circuit element. The jumper pin 173i is electrically connected to the wiring W1. The jumper plug 174c can electrically connect one of the jumper pins 173g and 173h to the jumper pin 173i.

The test board 400 according to the fourth embodiment includes the plurality of sockets 120 like the test board 200 according to the second embodiment. However, such a configuration is only an example. For example, the test board 400 according to the fourth embodiment may include only one socket 120 like the test board 100 according to the first embodiment.

Further, the number of current paths between the wiring W1 and the external terminal 160 may be three or more. Further, these plurality of current paths may or may not include circuit elements. Further, the circuit element provided in the plurality of current paths may be the resistance element R, the capacitor C, or other circuit elements.

Similarly, the number of current paths between the wiring W0 and the wiring W1 may be three or more. Further, these plurality of current paths may or may not include circuit elements. Further, the circuit element provided in the plurality of current paths may be the resistance element R, the capacitor C, or other circuit elements.

Fifth Embodiment

In the test board 200 according to the second embodiment, all the connector pins 130 are electrically connected to the external terminal 160 via the connection mechanism 170. However, such a configuration is only an example. For example, it is possible to omit the current path 140 or the current path 150, in the current path corresponding to some connector pins 130. It is also possible to omit the jumper switch 171a. The following is an example of such a structure.

Figure 14:
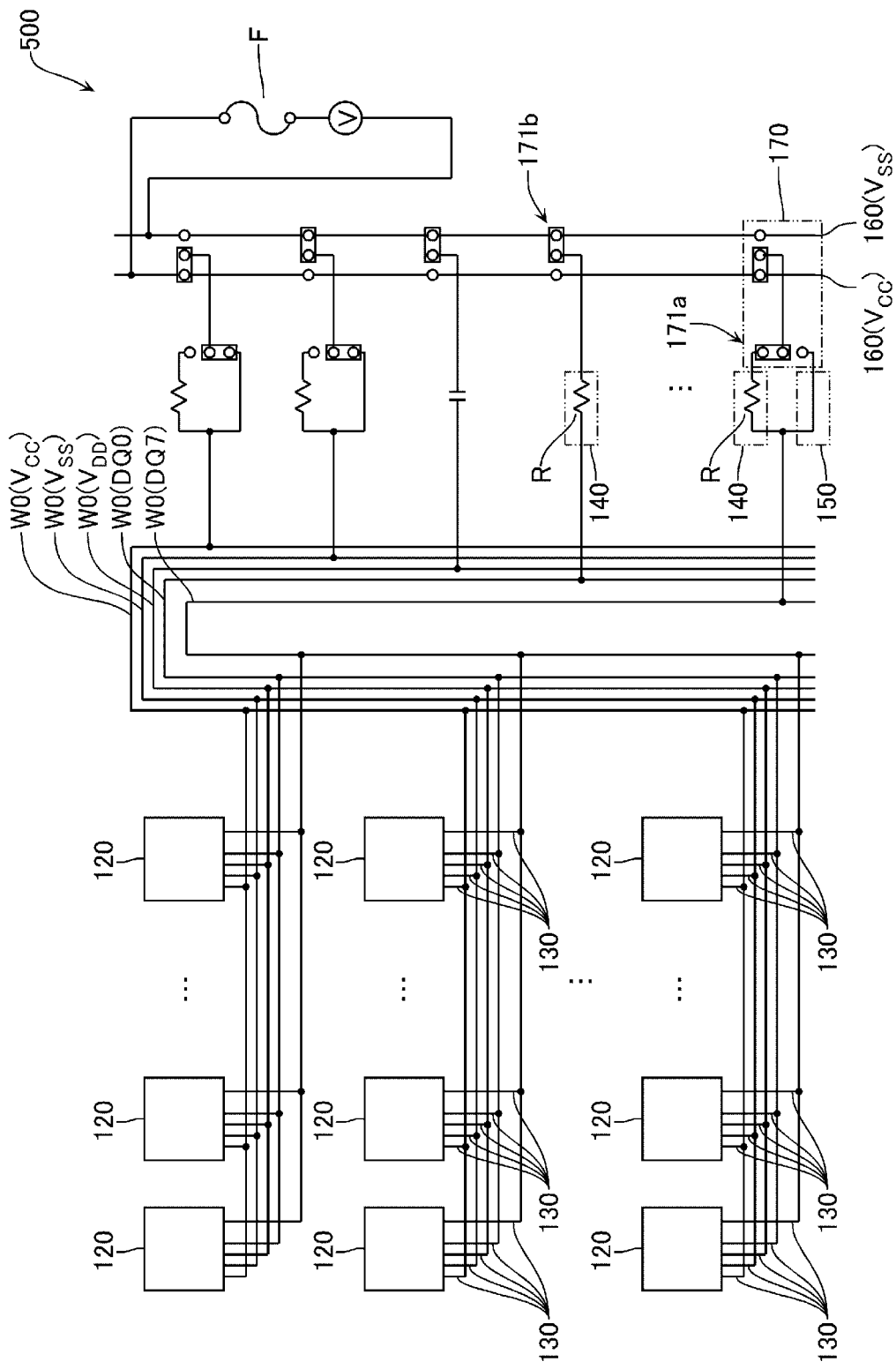
FIG. 14 is a schematic circuit diagram showing the configuration of a test board according to a fifth embodiment.

FIG. 14 is a schematic circuit diagram showing the configuration of a test board 500 according to the fifth embodiment. The test board 500 is basically configured in the same manner as the test board 200.

However, in the example of FIG. 14, some of the connector pins 130 are electrically connected to the external terminal 160 without going through the current path 150 and the jumper switch 171a.

In such a configuration, the number of the jumper switches 171a is less than the number of the connector pins 130 (for example, 154) corresponding to the respective sockets 120. Further, the number of at least one of the current paths 140 and 150 is less than the number of the connector pins 130 corresponding to each socket 120.

Here, when the types of the semiconductor devices 10 to be tested and the types of tests to be executed are limited, it may not be necessary to provide the jumper switches 171a corresponding to all the connector pins 130 on the substrate 110.

Further, according to such a configuration, the area of the jumper block 270a as described with reference to FIGS. 9 and 10 can be reduced. Further, for example, when the size of the substrate 110 is fixed, it is possible to mount more sockets 120 on the substrate 110.

It should be noted that FIG. 14 shows an example in which some of the current paths 150 and the jumper switch 171a are omitted, from the test board 200 according to the second embodiment. However, such a configuration is only an example. For example, it is possible to omit some of the current paths 140 and 150 and the jumper switch 171a, from the test board 100 (FIG. 3) according to the first embodiment. For example, it is possible to omit some of the current paths 140, 150, and 340 and the jumper switch 371a, from the test board 300 (FIG. 12) according to the third embodiment. For example, it is possible to omit some of the current paths 140, 150, 440, and 450 and the jumper switches 171a and 171c, from the test board 400 (FIG. 13) according to the fourth embodiment.

Further, in any of the embodiments, it is possible to omit some of the jumper switch 171b. Thus, not only the area of the jumper block 270a but also the area of the jumper block 270b can be reduced.

Sixth Embodiment

The test board 200 (FIG. 11) according to the second embodiment includes the two jumper switches 171 as a configuration in the connection mechanism 170. Each of these two jumper switches 171 includes the three jumper pins 173. However, such a configuration is only an example, and the configuration in the connection mechanism 170 can be appropriately adjusted. For example, instead of such a jumper switch 171, it is also possible to use a jumper switch including two jumper pins. The following is an example of such a structure.

Jumper Switch

Figure 15:
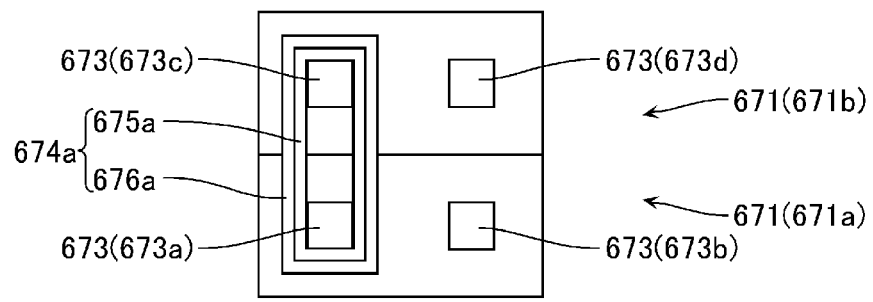
FIG. 15 is a schematic plan view showing the configuration of a jumper switch in a sixth embodiment.
Figure 16:
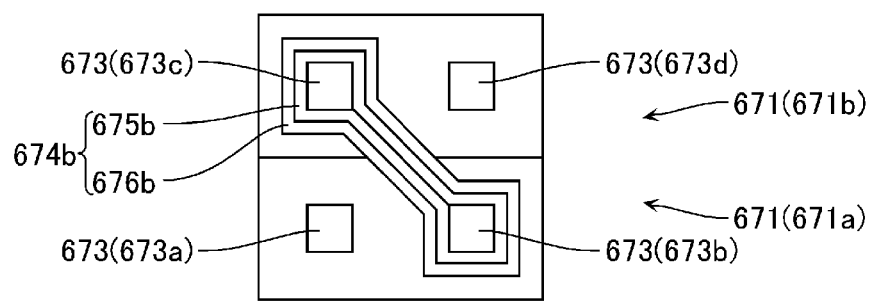
FIG. 16 is a schematic plan view showing the configuration of the jumper switch in the sixth embodiment.

FIGS. 15 and 16 are schematic plan views showing the configuration of a jumper switch 671 according to the sixth embodiment. FIGS. 15 and 16 illustrate two jumper switches 671 arranged in the Y direction. In FIGS. 15 and 16, one jumper switch 671 is shown as a jumper switch 671a, and the other jumper switch 671 is shown as a jumper switch 671b.

The jumper switch 671 is basically configured in the same manner as the jumper switch 171.

However, the jumper switch 671 includes two jumper pins 673. In FIGS. 15 and 16, one jumper pin 673 of the jumper switch 671a is shown as a jumper pin 673a, and the other jumper pin 673 is shown as a jumper pin 673b. Further, one jumper pin 673 of the jumper switch 671b is shown as a jumper pin 673c, and the other jumper pin 673 is shown as a jumper pin 673d.

Further, FIG. 15 illustrates a jumper plug 674a. The jumper plug 674a is used to electrically connect two jumper pins 673 arranged in the Y direction. For example, it is used when electrically connecting the jumper pins 673a and 673c and when electrically connecting the jumper pins 673b and 673d. The jumper plug 674a includes a metal plate 675a and a cover 676a such as a resin that covers the outer peripheral surface of the metal plate 675a. The metal plate 675a has a square cylinder shape and is able to surround the two jumper pins 673 arranged in the Y direction and not to surround the other two jumper pins 673. The inner peripheral surface of the metal plate 675a includes a part that comes into contact with the outer peripheral surface of the jumper pin 673a or the jumper pin 673b. Further, the inner peripheral surface of the metal plate 675a includes a part that comes into contact with the outer peripheral surface of the jumper pin 673c or the jumper pin 673d.

Further, FIG. 16 illustrates a jumper plug 674b. The jumper plug 674b is used to electrically connect two jumper pins 673 having different positions in the X direction. For example, it is used when electrically connecting the jumper pins 673a and 673d and when electrically connecting the jumper pins 673b and 673c. The jumper plug 674b includes a metal plate 675b and a cover 676b such as a resin that covers the outer peripheral surface of the metal plate 675b. The metal plate 675b has a shape and is able to surround two jumper pins 673 arranged in the diagonal direction, among the four jumper pins 673, and not to surround the other two jumper pins 673. The inner peripheral surface of the metal plate 675b includes a part that comes into contact with the outer peripheral surface of the jumper pin 673a or the jumper pin 673b. Further, the inner peripheral surface of the metal plate 675*b* includes a part that comes into contact with the outer peripheral surface of the jumper pin 673*c* or the jumper pin 673*d*.

The configurations shown in FIGS. 15 and 16 may be changed by exchanging the X direction and the Y direction.

Test Board

Figure 17:
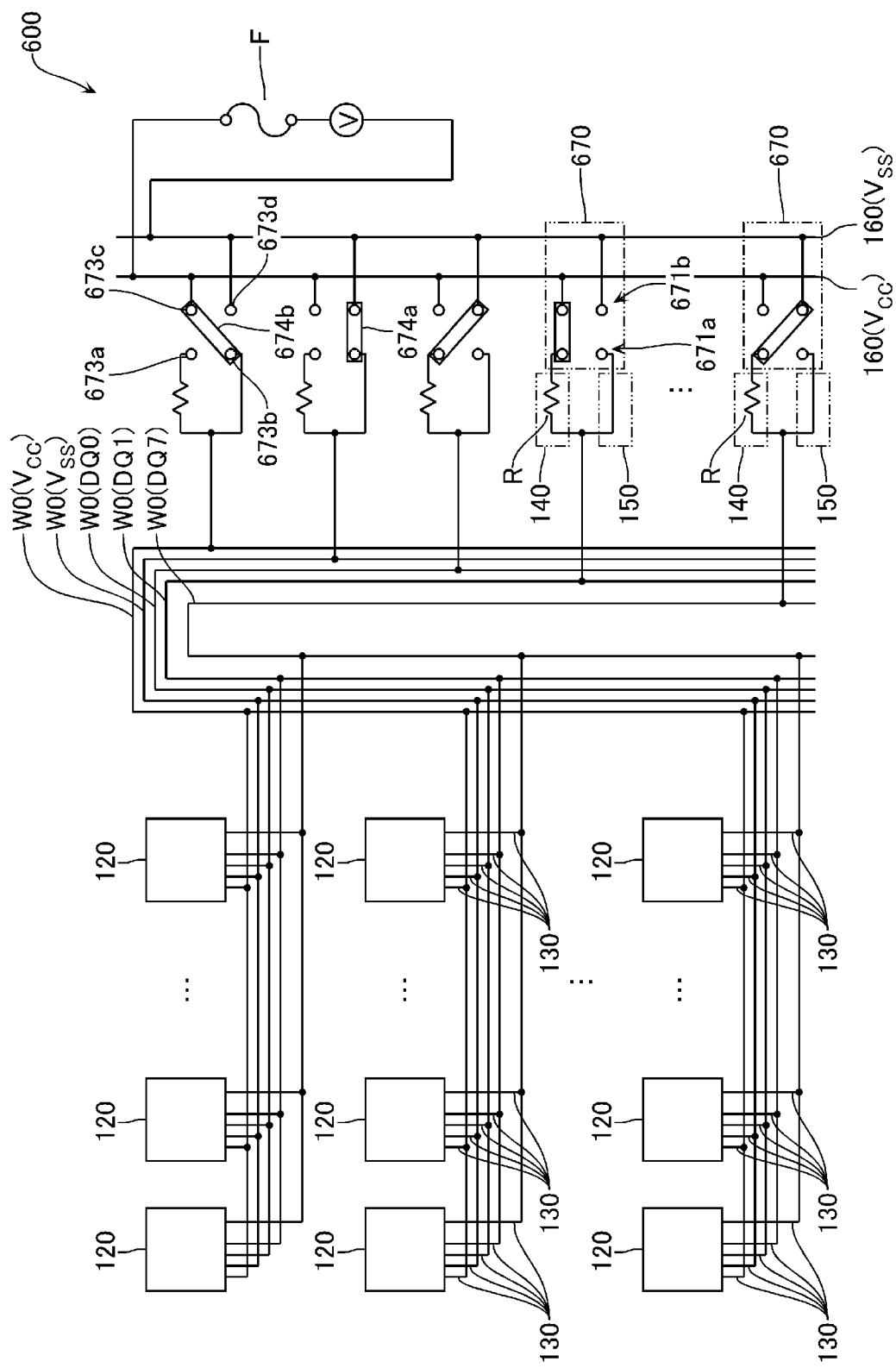
FIG. 17 is a schematic circuit diagram showing the configuration of a test board according to the sixth embodiment.

FIG. 17 is a schematic circuit diagram showing the configuration of a test board 600 according to the sixth embodiment. The test board 600 is basically configured in the same manner as the test board 200. However, the test board 600 includes a connection mechanism 670 instead of the connection mechanism 170.

The connection mechanism 670 includes the two jumper switches 671*a* and 671*b* described with reference to FIGS. 15 and 16. In the example of FIG. 17, the jumper pin 673*a* is electrically connected to the connector pin 130 via the current path 140 including the resistance element R. The jumper pin 673*b* is electrically connected to the connector pin 130 via a current path 150 that does not include a circuit element. The jumper pin 673*c* is electrically connected to the external terminal 160 ($V_{CC}$). The jumper pin 673*d* is electrically connected to the external terminal 160 ($V_{SS}$).

Here, as described above, the jumper switch 171 includes the three jumper pins 173, whereas the jumper switch 671 includes the two jumper pins 673. Therefore, the area of the jumper switch 671 in the XY plane is smaller than the area of the jumper switch 171 in the XY plane.

According to such a configuration, the areas of the jumper blocks 270*a* and 270*b* as described with reference to FIGS. 9 and 10 can be reduced. Further, for example, when the size of the substrate 110 is fixed, it is possible to mount more sockets 120 on the substrate 110.

Further, according to such a configuration, the areas of the jumper blocks 270*a* and 270*b* can be reduced without limiting the types of the semiconductor device 10 and the types of tests to be executed. Further, it is possible to mount more sockets 120 on the substrate 110.

It should be noted that FIG. 17 shows an example in which the jumper switch 671 provided with the two jumper pins 673 is used in the test board 200 according to the second embodiment. However, such a configuration is only an example. For example, the test boards 100, 200, 400, and 500 (FIG. 3, FIG. 11, FIG. 13, and FIG. 14) according to the first embodiment, the second embodiment, the fourth embodiment, and the fifth embodiment may be provided with the connection mechanism 670 instead of the connection mechanisms 170.

Seventh Embodiment

The jumper switch 171 according to the second embodiment includes the three jumper pins 173. Further, the jumper switch 671 according to the sixth embodiment includes the two jumper pins 673. However, such a configuration is only an example. For example, one jumper switch may be provided with four or more jumper pins. The following is an example of such a structure.

Jumper Switch

Figure 18:
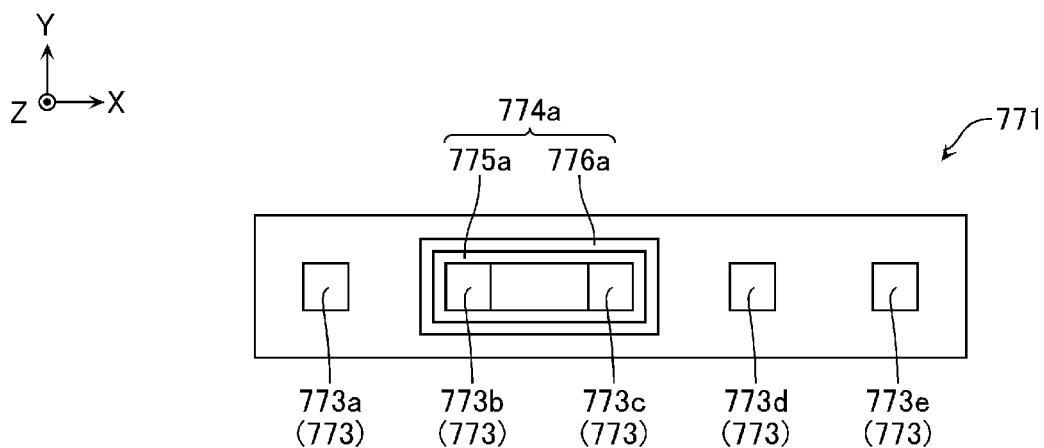
FIG. 18 is a schematic plan view showing the configuration of a jumper switch in a seventh embodiment.
Figure 19:
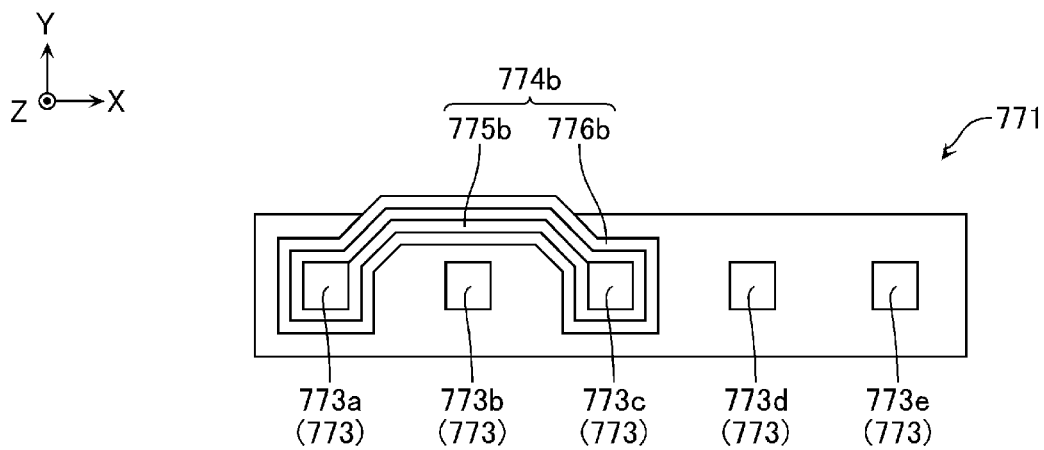
FIG. 19 is a schematic plan view showing the configuration of the jumper switch in the seventh embodiment.

FIGS. 18 and 19 are schematic plan views showing the configuration of a jumper switch 771 according to the seventh embodiment.

The jumper switch 771 is basically configured in the same manner as the jumper switch 171. However, the jumper switch 771 includes five jumper pins 773. In FIGS. 18 and 19, these five jumper pins 773 are shown as jumper pins 773*a*, 773*b*, 773*c*, 773*d*, and 773*e* from one side to the other in the X direction.

Further, FIG. 18 illustrates a jumper plug 774*a*. The jumper plug 774*a* includes a metal plate 775*a* and a cover 776*a* such as a resin that covers the outer peripheral surface of the metal plate 775*a*. The metal plate 775*a* has a square cylinder shape and is able to surround two jumper pins 773 adjacent to each other in the X direction and not to surround the other jumper pins 773. The inner peripheral surface of the metal plate 775*a* includes a part that comes into contact with the outer peripheral surface of the jumper pin 773*b* or the jumper pin 773*d*. Further, the inner peripheral surface of the metal plate 775*a* includes a part that comes into contact with the outer peripheral surface of the jumper pin 773*c*. The jumper plug 774*a* is used to electrically connect the two jumper pins 773 adjacent to each other in the X direction. For example, it is used when electrically connecting jumper pins 773*b* and 773*c* and when electrically connecting jumper pins 773*c* and 773*d*.

Further, FIG. 19 illustrates a jumper plug 774*b*. The jumper plug 774*b* includes a metal plate 775*b* and a cover 776*b* such as a resin that covers the outer peripheral surface of the metal plate 775*b*. The metal plate 775*b* has a shape that is able to surround two jumper pins 773 which are lined up across another jumper pin, among the plurality of jumper pins 773, and not to surround the other jumper pin. The inner peripheral surface of the metal plate 775*b* includes a part that comes into contact with the outer peripheral surface of the jumper pin 773*a* or the jumper pin 773*e*. Further, the inner peripheral surface of the metal plate 775*b* includes a part that comes into contact with the outer peripheral surface of the jumper pin 773*c*. The jumper plug 774*b* is used to electrically connect the two jumper pins 773 that are lined up across another jumper pin. For example, it is used when electrically connecting the jumper pins 773*a* and 773*c* and when electrically connecting the jumper pins 773*c* and 773*e*.

The configurations shown in FIGS. 18 and 19 may be changed by exchanging the X direction and the Y direction.

Test Board

As described with reference to FIGS. 18 and 19, the jumper switch 771 may include four or more jumper pins 773. Such a jumper switch 771 can be used in various manners.

For example, as described with reference to FIG. 12 and the like, the number of current paths between the wiring W0 and the external terminal 160 may be three or more. In such a case, it is possible to use the jumper switch 771 having four or more jumper pins 773.

Further, depending on the type of test to be executed, during the test execution, not only the power supply voltage $V_{CC}$ and the ground voltage $V_{SS}$ but also data signals DQ0 to DQ7, control signals, and the like may be input to the terminals 13 (FIG. 2) of the semiconductor device 10. Even in such a case, it is possible to use the jumper switch 771 having four or more jumper pins 773.

Figure 20:
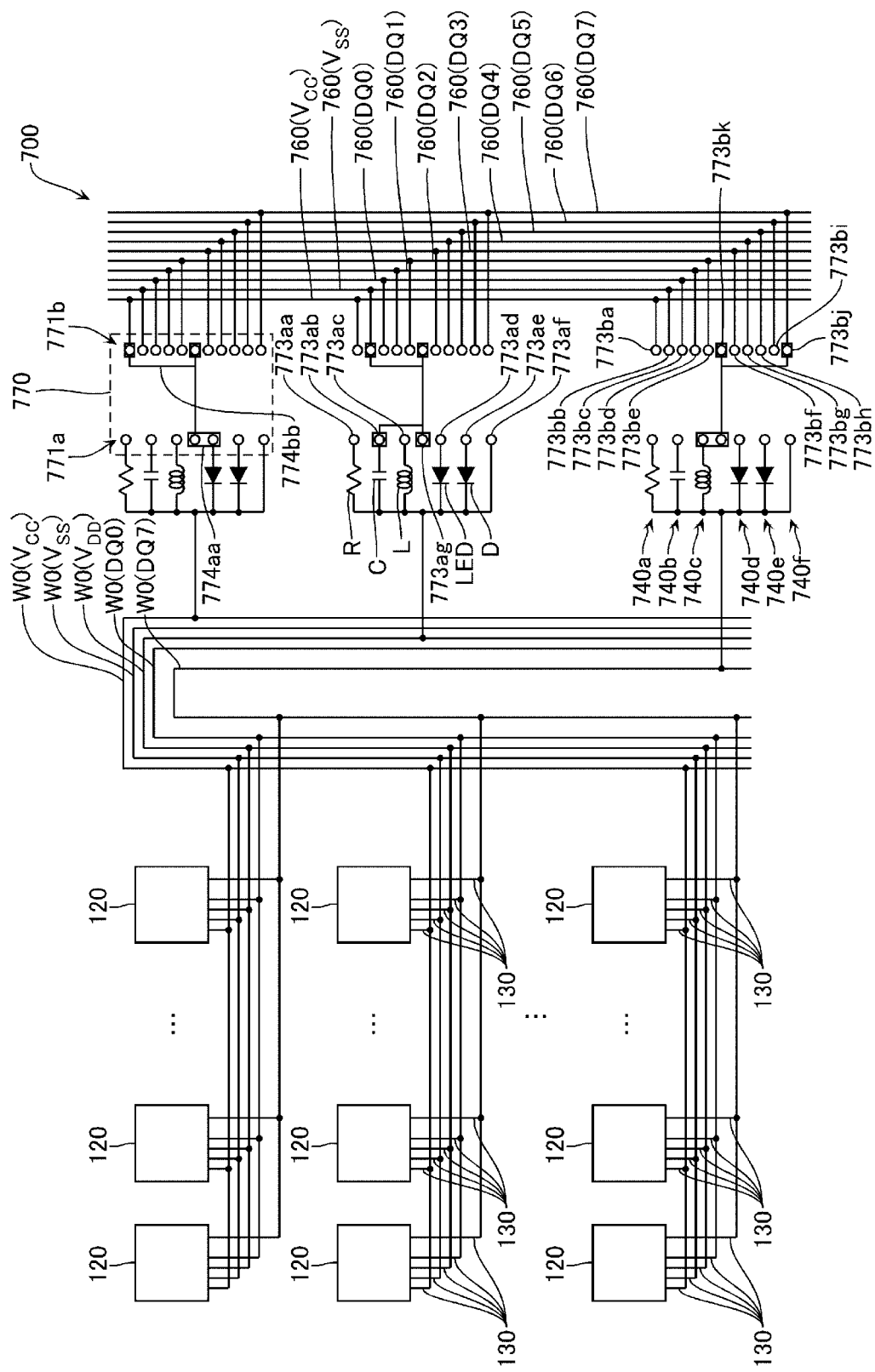
FIG. 20 is a schematic circuit diagram showing the configuration of a test board according to the seventh embodiment.

The following is an example of such a structure. FIG. 20 is a schematic circuit diagram showing the configuration of a test board 700 according to the seventh embodiment. The test board 700 is basically configured in the same manner as the test board 200.

However, the test board 700 includes a plurality of external terminals 760 capable of supplying the power supply voltage $V_{CC}$, the ground voltage $V_{SS}$, and the data signals DQ0 to DQ7. Each of the external terminals 760 is configured to be electrically connectable to the connector pin 130 via wiring or the like provided on the substrate 110. In the described example, the external terminal 760 to which the power supply voltage $V_{CC}$ is supplied is shown as the external terminal 760 ($V_{CC}$). Further, the external terminal 760 to which the ground voltage $V_{SS}$ is supplied is shown as the external terminal 760 ($V_{SS}$). Further, the plurality of external terminals 760 to which the data signals DQ0 to DQ7 are supplied are shown as external terminals 760 (DQ0) to 760 (DQ7), respectively.

Further, the test board 700 includes a plurality of current paths 740a to 740f as current paths that can be electrically connected between the plurality of connector pins 130 and the external terminal 760. The plurality of (for example, 154) current paths 740a to 740f are provided corresponding to the plurality of (for example, 154) connector pins 130, respectively. The current path 740a includes the resistance element R as a circuit element. The current path 740b includes the capacitor C as a circuit element. The current path 740c includes the inductor L as a circuit element. The current path 740d includes the light emitting diode LED as a circuit element. The current path 740e includes a diode D other than the light emitting diode LED as a circuit element. The current path 740f does not include a circuit element.

Further, the test board 700 includes a connection mechanism 770 instead of the connection mechanism 170. The connection mechanism 770 includes jumper switches 771a and 771b.

The jumper switch 771a includes a plurality of jumper pins 773aa to 773ag. The jumper pins 773aa to 773af are electrically connected to the connector pins 130 via the current paths 740a to 740f, respectively. The jumper pin 773ag is provided corresponding to the jumper pins 773aa to 773af, and are disposed, for example, between the jumper pins 773ac and 773ad. A jumper plug 774aa may have, for example, the same configuration as the jumper plug 774a described with reference to FIG. 18 or the jumper plug 774b described with reference to FIG. 19. The jumper plug 774aa can electrically connect one of the jumper pins 773aa to 773af to the jumper pin 773ag.

The jumper switch 771b includes a plurality of jumper pins 773ba to 773bk. The jumper pin 773ba is electrically connected to the external terminal 760 ($V_{CC}$). The jumper pin 773bb is electrically connected to the external terminal 760 ($V_{SS}$). The jumper pins 773bc to 773bj are electrically connected to the external terminals 760 (DQ0) to 760 (DQ7), respectively. The jumper pin 773bk is provided corresponding to the jumper pins 773ba to 773bj, and are disposed, for example, between the jumper pins 773be and 773bf. The jumper pin 773bk is electrically connected to the jumper pin 773ag. A jumper plug 774bb may have, for example, the same configuration as the jumper plug 774a described with reference to FIG. 18 or the jumper plug 774b described with reference to FIG. 19. The jumper plug 774bb can electrically connect one of the jumper pins 773ba to 773bj to the jumper pin 773bk.

The test board 700 according to the seventh embodiment includes the plurality of sockets 120 like the test board 200 according to the second embodiment. However, such a configuration is only an example. For example, the test board 700 according to the seventh embodiment may include only one socket 120, like the test board 100 according to the first embodiment.

Further, for example, even in the test board 700 according to the seventh embodiment, a plurality of circuit elements may be connected in series between the wiring W0 and the external terminal 760.

Eighth Embodiment

In the test board 700 according to the seventh embodiment, some of the current paths 740a to 740f, the jumper switches 771a and 771b, and other configurations may be omitted. The following is an example of such a structure.

Figure 21:
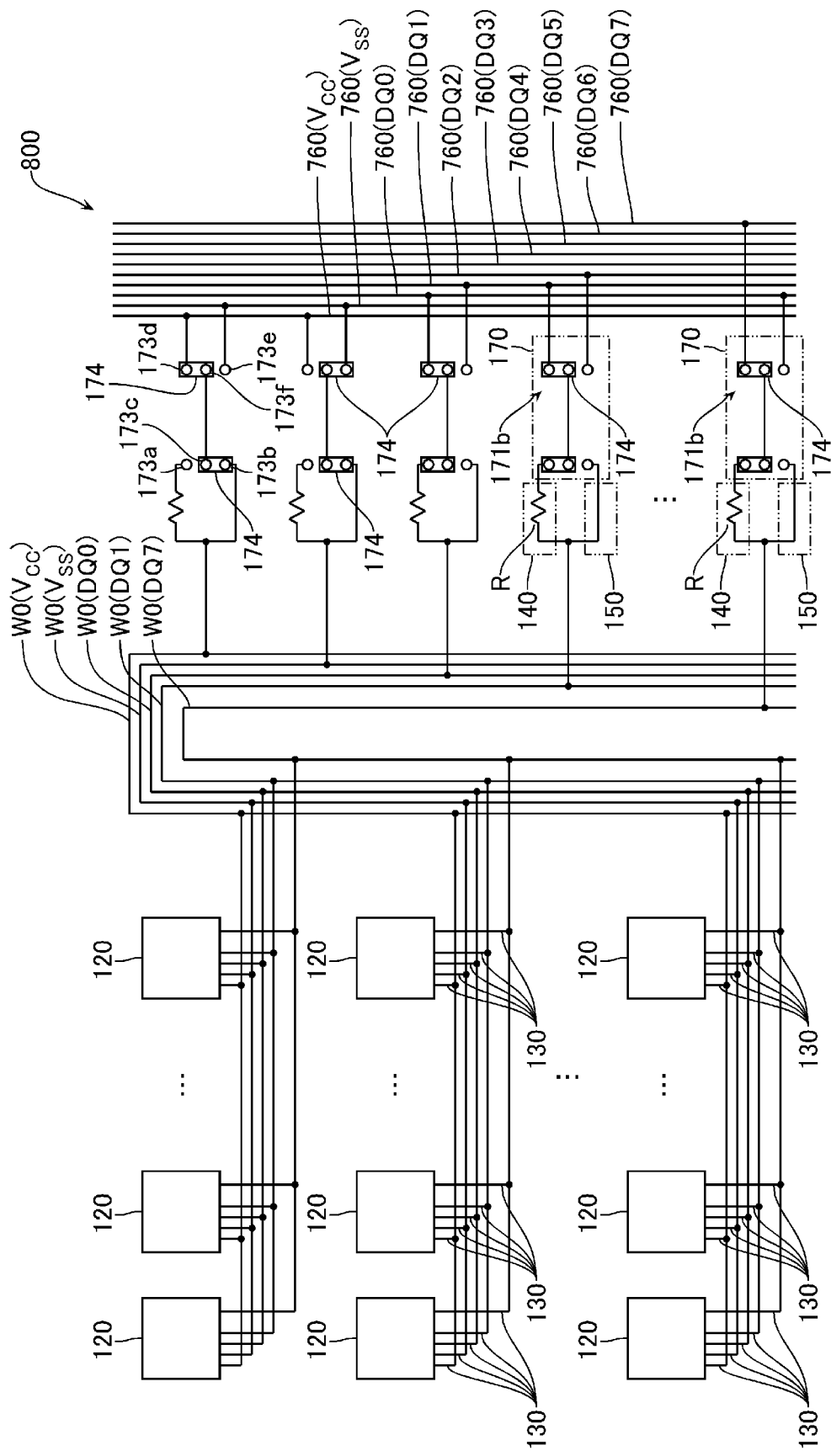
FIG. 21 is a schematic circuit diagram showing the configuration of a test board according to the eighth embodiment.

FIG. 21 is a schematic circuit diagram showing the configuration of a test board 800 according to the eighth embodiment. The test board 800 is basically configured in the same manner as the test board 200.

However, the test board 800 includes the plurality of external terminals 760 according to the seventh embodiment instead of the two external terminals 160 according to the second embodiment.

Further, in the test board 800, the jumper pins 173d and 173e of the plurality of jumper switches 171b are electrically connected to different external terminals 760, respectively.

For example, when the plurality of jumper plugs 174 are connected to the plurality of jumper pins 173d and 173f, respectively, the plurality of terminals 13 for supplying data signals DQ0 to DQ7, of a predetermined semiconductor device 10 (for example, eMMC), are connected to the plurality of external terminals 760 for supplying data signals DQ0 to DQ7, respectively.

Further, for example, when the plurality of jumper plugs 174 are connected to the plurality of jumper pins 173e and 173f, respectively, the plurality of terminals 13 for supplying data signals DQ0 to DQ7, of another predetermined semiconductor device 10 (for example, UFS), are connected to the plurality of external terminals 760 for supplying data signals DQ0 to DQ7, respectively.

Other Embodiments

The test boards according to the first to eighth embodiments have been described above. However, the above configuration is only an example, and the specific configuration may be adjusted as appropriate. For example, in the first to eighth embodiments, the socket 120 and the connection mechanism (jumper switch) are provided on the same substrate 110. However, the socket 120 and the connection mechanism may be provided on separate substrates. In such a case, these substrates may be connected and used as one test board.

Further, in the description of FIG. 8, a test method using the test board 100 according to the first embodiment is described. However, even when the test boards according to the other embodiments are used, it is possible to execute the test of the semiconductor device 10 by the same method as the method described with reference to FIG. 8.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A test board comprising:
   a substrate;
   a socket mounted on the substrate and including a first connector pin to be connected to a first terminal of a semiconductor device when the semiconductor device is mounted in the socket;
   a plurality of external terminals through which a voltage or a signal is supplied to the first connector pin;

a first current path that is electrically connectable between the first connector pin and one of the plurality of external terminals, and includes a first circuit element;
a second current path that is electrically connectable between the first connector pin and one of the plurality of external terminals, and includes no circuit element or a second circuit element different from the first circuit element; and
a first connection mechanism capable of electrically connecting the first connector pin to one of the plurality of external terminals via one of the first current path and the second current path, wherein the first connection mechanism includes
a first jumper pin electrically connected to the first connector pin via the first current path,
a second jumper pin electrically connected to the first connector pin via the second current path,
a third jumper pin electrically connectable to one of the plurality of external terminals,
a first jumper plug including a first part connectable to the first jumper pin or the second jumper pin, and a second part connectable to the third jumper pin,
a fourth jumper pin electrically connected to one of the plurality of external terminals,
a fifth jumper pin electrically connected to another one of the plurality of external terminals,
a sixth jumper pin electrically connected to the third jumper pin, and
a second jumper plug including a third part connectable to the fourth jumper pin or the fifth jumper pin, and a fourth part connectable to the sixth jumper pin.

2. The test board according to claim 1, wherein
when the first current path is connected to one of the plurality of external terminals, the second current path is not connected to any of the plurality of external terminals.

3. The test board according to claim 1, wherein
when the first or second current path is connected to one of the plurality of external terminals, neither the first current path nor the second current path is connected to any of the other external terminals.

4. The test board according to claim 1, further comprising:
a first wiring that is provided in a current path between the first connector pin and one of the plurality of external terminals, and is electrically connectable to one of the plurality of external terminals via one of the first current path and the second current path;
a third current path that is electrically connectable between the first wiring and the first connector pin, and includes a third circuit element;
a fourth current path that is electrically connectable between the first wiring and the first connector pin, and includes no circuit element or a fourth circuit element different from the third circuit element; and
a second connection mechanism capable of connecting the first connector pin to the first wiring via one of the third current path and the fourth current path.

5. The test board according to claim 4, wherein
the second connection mechanism includes
a seventh jumper pin electrically connected to the first connector pin via the third current path,
an eighth jumper pin electrically connected to the first connector pin via the fourth current path,
a ninth jumper pin electrically connected to the first wiring, and
a third jumper plug including a fifth part connectable to the seventh jumper pin or the eighth jumper pin, and a sixth part connectable to the ninth jumper pin.

6. A test board comprising:
a substrate;
a socket mounted on the substrate and including a plurality of connector pins to be connected to a plurality of terminals of a semiconductor device when the semiconductor device is mounted in the socket;
a plurality of external terminals through each of which a voltage or a signal is supplied to one of the plurality of connector pins;
a plurality of first current paths, each of which is electrically connectable between one of the plurality of connector pins and one of the plurality of external terminals, and includes a first circuit element;
a plurality of second current paths, each of which is electrically connectable between one of the plurality of connector pins and one of the plurality of external terminals, and includes no circuit element or a second circuit element different from the first circuit element; and
a plurality of first connection mechanisms each capable of electrically connecting one of the plurality of connector pins to one of the plurality of external terminals via either one of the plurality of first current paths or one of the plurality of second current paths, wherein each of the first connection mechanisms includes
a first jumper pin electrically connected to one of the connector pins via one of the first current paths,
a second jumper pin electrically connected to said one of the connector pins via one of the second current paths,
a third jumper pin electrically connectable to one of the plurality of external terminals,
a first jumper plug including a first part connectable to the first jumper pin or the second jumper pin, and a second part connectable to the third jumper pin,
a fourth jumper pin electrically connected to one of the plurality of external terminals,
a fifth jumper pin electrically connected to another one of the plurality of external terminals,
a sixth jumper pin electrically connected to the third jumper pin, and
a second jumper plug including a third part connectable to the fourth jumper pin or the fifth jumper pin, and a fourth part connectable to the sixth jumper pin.

7. The test board according to claim 6, wherein
the number of the plurality of first connection mechanisms is equal to the number of the plurality of connector pins.

8. The test board according to claim 6, wherein
the number of the plurality of first connection mechanisms is smaller than the number of the plurality of connector pins.

* * * * *